United States Patent
Roth et al.

(10) Patent No.: US 6,582,492 B1
(45) Date of Patent: Jun. 24, 2003

(54) METHOD FOR PRODUCING MELT IRON

(75) Inventors: Jean-Luc Roth, Thionville (FR); Marc Solvi, Ehlange s/Mess (LU); Jean Monai, Pétange (LU)

(73) Assignee: Paul Wurth S.A., Luxembourg (LU)

( * ) Notice: Subject to any disclaimer, the term of this patent is extended or adjusted under 35 U.S.C. 154(b) by 4 days.

(21) Appl. No.: 09/926,801

(22) PCT Filed: Jun. 19, 2000

(86) PCT No.: PCT/EP00/05622

§ 371 (c)(1),
(2), (4) Date: Dec. 20, 2001

(87) PCT Pub. No.: WO00/79012

PCT Pub. Date: Dec. 28, 2000

(30) Foreign Application Priority Data

Jun. 21, 1999 (LU) .............................................. 90 406

(51) Int. Cl.[7] .............................................. C21B 13/08
(52) U.S. Cl. ........................ 75/483; 266/160; 266/177
(58) Field of Search .............................. 75/483; 266/160, 266/177

(56) References Cited

U.S. PATENT DOCUMENTS

| | | |
|---|---|---|
| 2,089,782 A | 8/1937 | Industrimetoder |
| 4,160,663 A | 7/1979 | Hsieh |
| 6,235,082 B1 * | 5/2001 | Kepplinger et al. .......... 75/448 |

FOREIGN PATENT DOCUMENTS

| | | |
|---|---|---|
| DE | 42 40 197 | 6/1994 |
| JP | 62 188714 | 8/1987 |
| WO | 97 17437 | 5/1997 |

OTHER PUBLICATIONS

"High Carbon Dri with DirectHot Charging to EAF" Steel Times International—Incorporating Iron & Steel International, GB, FMJ International Publications, Redhill, Surrey, England, vol. 17, No. 6, pp. 42–43 Nov. 1, 1993.

* cited by examiner

Primary Examiner—Melvyn Andrews
(74) Attorney, Agent, or Firm—Oblon, Spivak, McClelland, Maier & Neustadt, P.C.

(57) ABSTRACT

The invention concerns a method for producing melt iron comprising the following steps: a) reducing the iron ore particles to form pre-reduced iron comprising excess free carbon; b) hot process transfer of the pre-reduced iron in a smelting furnace; c) smelting the pre-reduced iron in a smelting furnace to obtain melt iron.

11 Claims, 1 Drawing Sheet

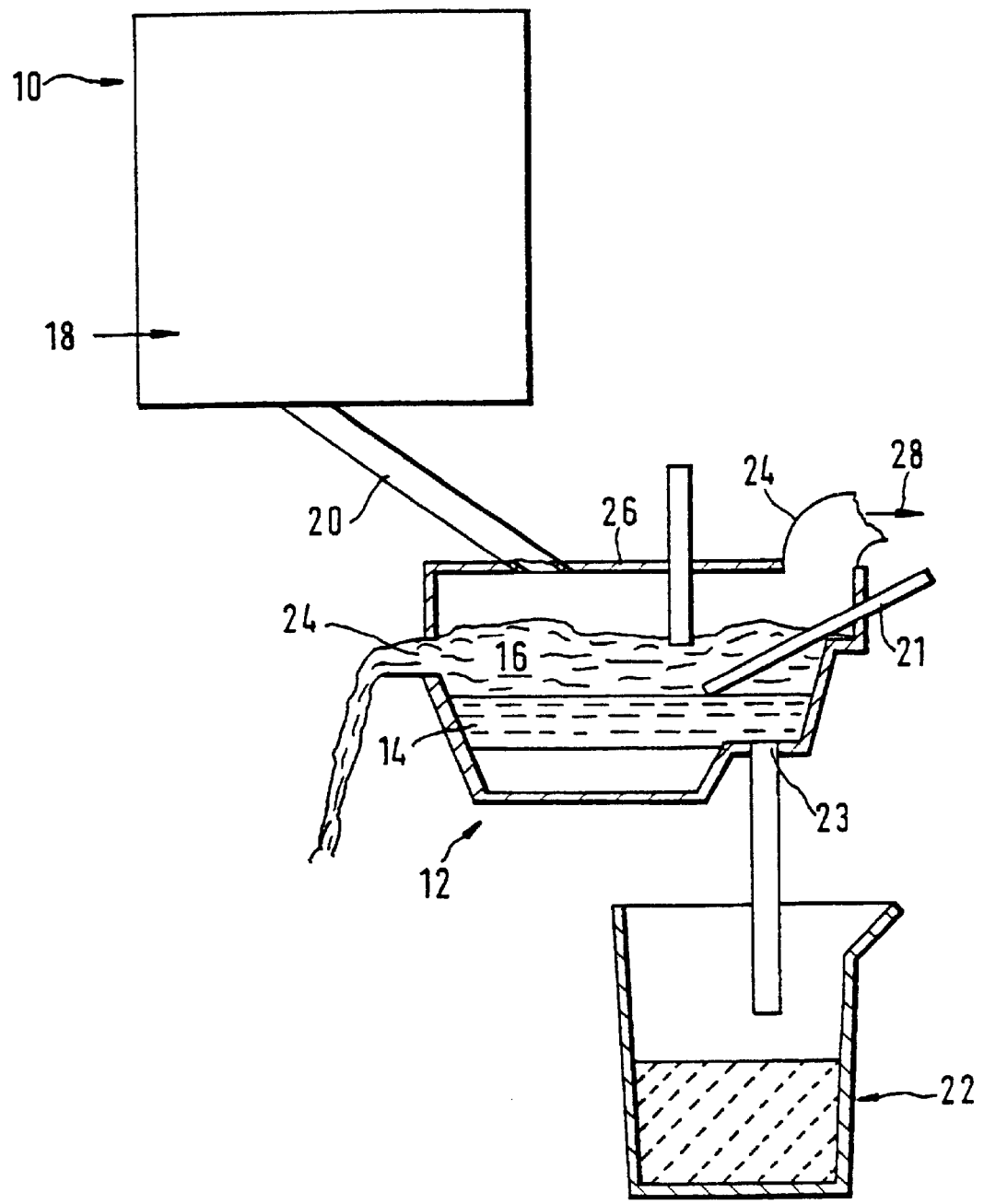

METHOD FOR PRODUCING MELT IRON

The invention relates to a method for producing molten pig iron.

For many years, considerable efforts have been made to develop reduction-melting methods capable of replacing the blast furnace in the production of molten pig iron, particularly using production units of smaller volume and avoiding the preparation of materials, i.e. directly using fines from ore and coal. Such methods are of interest, since it is possible in principle to avoid installations that need sizeable investment such as coke production plants and ore pelletisation plants.

The methods currently available have some disadvantages.

One of the difficulties of such a method for producing pig iron directly lies in the fact that the two components of the method—the direct reduction and the melting—require different operating conditions. This is because, during the reduction of the iron ore particles, an attempt is made to maintain a reducing atmosphere, while during the melting, large amounts of oxygen must be injected so that the energy in the carbon-containing fuels can be exploited efficiently.

In the known methods, the gases from the melting furnace are injected into the pre-reduction furnace. As the gases from the melting furnace are poor in carbon monoxide and rich in carbon dioxide, the injection of large amounts of such gases into the pre-reduction furnace upsets the reduction of the iron ore.

In an improved version of this method, the hot gases from the melting furnace are enriched in carbon monoxide before being injected into the pre-reduction furnace. The gases rich in carbon dioxide from the melting furnace are put into contact with some coal, and a large proportion of the carbon dioxide is converted into carbon monoxide by reacting with the coal. The increased reducing power of the gases from the melting furnace of course promotes the reaction inside the pre-reduction furnace. However, this operation is energetically expensive.

It would be advantageous to have available an optimised method for producing pig iron directly from the pre-reduced iron particles.

The document WO 97/17473 relates to a method of producing metals and metal alloys from metallic oxides. In a first step of the method, metallic oxides and/or partially-reduced metallic oxides and a solid carbonaceous material are injected into a pre-reduction vessel in order to reduce partially metallic oxides and/or partially-reduced metallic oxides, and release at least part of the volatile fraction of the solid carbonaceous material. In a second step, the reduction of the partially-reduced metallic oxides is continued in order to produce molten metal. To achieve this, the partially-reduced metallic oxides and the solid carbonaceous material at least partially devolatilised in the first stage are injected into a reduction/melting vessel containing a bath of molten metal and slag.

The first stage of the method in WO 97/17473 preferably comprises a drying, preheating and partial reduction stage for the metallic oxides in a first pre-reduction vessel, with gases from the reduction/melting furnace and/or the second pre-reduction vessel. After that, the pre-reduced, dried and pre-heated metallic oxides are transferred, together with the solid carbonaceous material, to the second pre-reduction vessel in order to continue the reduction of the metallic oxides and the at least partial liberation of the volatile fractions in the solid material containing carbon.

Document DE 42 40 197-A relates to a method of producing pig iron from metallic oxides. The iron ore is first treated in a reduction unit and then introduced into a melting unit.

In the reduction unit, a reducing gas comprising carbon monoxide and hydrogen flows from bottom to top. The iron ore and, and optionally additives, passes from top to bottom, where it is discharged for subsequent treatment in the melting unit. Reducing gas is taken from the melting unit. The reduction unit comprises a set of gas distribution platforms, arranged obliquely in a zigzag cascade, along which iron ore, and optionally additives, passes downwards through the furnace. Coarse-grained metallic oxides and any necessary additives are introduced into the upper part of the reduction unit. Metallic oxides of finer granulometry are introduced into the central part of the reduction unit, and the optional additives of finer granulometry are introduced into the central or lower part of the reduction unit.

The reducing gas, which rises through reduction unit, thus passes through layers of iron ore optionally mixed with additives, moving down from the top to the bottom of the furnace, and in this way effects the reduction and simultaneously frees itself from most of the carried dust in this layers.

JP 62 188714-A discloses a method for producing molten pig iron. A fixed-bed reduction/coking reactor is charged with iron ore and coal in order to pre-reduce the iron ore and convert the coal to coke. Pre-reduced iron ore and coke is then used to charge a refining furnace to melt them using oxygen injection.

The objective of the present invention is to propose an optimised method for the production of pig iron.

In conformity with the invention, this objective is achieved by a method of producing molten pig iron comprising the following steps:

(a) reduction of iron ore particles to form pre-reduced iron containing surplus free carbon.

(b) transfer while hot of the pre-reduced iron to a melting furnace, (c) melting of the pre-reduced iron particles in a melting furnace in order to obtain the molten pig iron.

According to an important aspect of the invention, step (a) comprises the following steps:

(a1) the iron ore is introduced into a multiple-hearth furnace with several superimposed hearths and it is deposited on the uppermost hearth of the multiple-hearth furnace, (a2) the iron ore is gradually transferred to the lower hearths, (a3) a carbon-containing reducing agent is added to one or more of the lower hearths in sufficient amounts to reduce the iron ore and to ensure that there is surplus free carbon, (a4) the multiple-hearth furnace is heated and the iron ore is reduced on contact with the carbon-containing reducing agent and the gases produced by the carbon-containing reducing agent at adequate temperatures, (a5) the excess gas produced by the carbon-containing reducing agent is burnt in the upper part of the multiple-hearth furnace and advantage is taken of the resultant heat to dry and pre-heat the iron ore in the upper hearths.

Slag-forming agents may also be added during step (a) or step (b). These slag-forming agents are chosen preferably from among a group consisting of lime, limestone flux and magnesia as well as mixtures of them.

Advantageously, the pre-reduced iron is compacted before its transfer to the melting furnace. Briquettes are formed which contain the pre-reduced iron, the surplus free carbon and, if necessary, the slag-forming agents. Since the briquettes have a higher density than the particles from which they are formed, they have the following advantages: they more easily penetrate the bath of molten pig iron contained in the melting furnace, a smaller amount of pre-reduced iron is trapped in the layer of slag covering the molten pig iron and a smaller proportion of the iron and free carbon is carried away by the gases escaping from the melting furnace.

The surplus carbon at the end of step (a) advantageously lies between 7 percent and 15 percent, and is preferably close to 10 percent.

The solid carbon-containing reducing agent is chosen from among coal or liquid or solid petroleum products. The volatile fractions contained in the carbon-containing reducing agent are eliminated during their residence inside the multiple-hearth furnace, and the sulphur is also partly eliminated.

Part of the surplus carbon is consumed during step (c).

According to a particular method of execution, the melting furnace is an electric arc furnace.

Oxygen is injected during step (c) in order to burn the surplus free carbon and thus to contribute a large proportion of the energy necessary for the melting during step (c). Moreover, the surplus free carbon is useful for terminating the reduction reactions and for carburising the pig iron.

It is important to note that, in the method according to the invention, the gases from the melting furnace are not injected into the reduction furnace. The reduction process is then undisturbed by these gases with high oxidising power.

One of the advantages of the present method is that the functioning of the two reactors is optimised. In effect, the production of a pre-reduced product incorporating surplus free carbon increases the speed of reduction and increases the rate of metallisation, but it also increases the cost of producing the pre-reduced iron particles. In traditional methods of producing pre-reduced iron particles, the aim is to obtain a product which contains only a little or no residual carbon since, of course, the carbon that remains in the finished product without having reacted represents an additional and uneconomic production cost.

In order to obtain this surplus free carbon, it is necessary to add a suitable amount of carbon-containing reducing agent during the reduction step.

Another advantage of the surplus free carbon in the pre-reduced iron lies in the fact that, in the reduction hearths of the reduction reactor, temperatures are very high and hence the carbon-containing reducing agent, in this case the coal, is relieved of its volatile fraction and is to a large extent desulphurised. It turned out that, during the melting step, the coal without its volatile fraction dissolved more easily in the bath of pig iron than the coal that still contained its volatile fraction. In addition, since the carbon-containing reducing agent is subjected to very high temperatures during its stay inside the reduction reactor, the sulphur content decreases considerably. The pig iron obtained in this way has lower sulphur contents. Of course, it would be possible to use coke instead of coal during the melting of the pre-reduced iron particles in order to obtain a higher solubility of the carbon. However, using coke instead of coal increases the production costs and does not solve the problem of the sulphur. The coke does not in fact contain volatile material; however, it contains substantially the same amount of sulphur as the coal used during its production.

The surplus carbon is burnt in the melting furnace and therefore enables electrical energy to be saved during the melting of the particles.

The addition of the carbon-containing reducing agent only at the level of the last hearths in the multiple-hearth furnace enables advantage to be taken of the residual heat from the gases to dry and pre-heat the iron ore particles and to burn the carbon monoxide completely. Separate post-combustion is unnecessary. In addition, the higher temperature of these last hearths further reduces the sulphur content in the free carbon.

It is therefore not the juxtaposition of two known methods but an interaction between two methods that leads to unexpected advantages.

Other special features and characteristics of the invention will emerge from the detailed description of an advantageous method of execution given below, as an illustrative example, with reference to the appended drawing. This shows:

FIG. 1: skeleton diagram of the method for producing molten pig iron according to the invention.

FIG. 1 is a skeleton diagram of a method for producing molten pig iron according to the present invention. In the figure can be seen a pre-reduction reactor, in this case a multiple-hearth furnace 10, in which iron ore particles are reduced to form pre-reduced iron. The pre-reduced iron is then transferred while hot to a melting furnace, in this case an electric furnace 12. The pre-reduced iron is melted here and a bath of molten pig iron 14 covered with a layer of slag 16 is obtained.

Thus, the first step in the method concerns the reduction of iron particles in the multiple-hearth furnace 10. The multiple-hearth furnace 10 comprises a series of vertically separated annular hearths. The iron ore particles are introduced at the upper hearth and are gradually transferred to the lower hearths.

Into the lower part of the multiple-hearth furnace 10, coal is introduced over several hearths, as indicated by the arrow 18. It should be appreciated that the coal is introduced in sufficient amounts to reduce the iron ore particles and to ensure surplus free coal. In other words, the pre-reduced iron contains surplus free coal. Preferably, the addition of the coal into the lower hearths of the multiple-hearth furnace 10 is such that, at the outlet from the furnace 10, there is about 10 percent of surplus free coal.

The reduction of the iron ore occurs on contact with the coal and the gases produced by the latter, by heating the multiple-hearth furnace 10 to temperatures up to 1050° C. to 1200° C. The surplus gas produced by the coal rises in the multiple-hearth furnace 10 and is burnt in the upper part of the said furnace. This combustion is used to dry and pre-heat the iron ore in the upper hearths.

It should be pointed out that the surplus free coal introduced increases the speed of the reduction and the rate of metallisation. It is a way of optimising the functioning of the multiple-hearth furnace 10 since the rate of pre-reduction and the productivity are increased.

At the outlet from the multiple-hearth furnace 10, the pre-reduced iron is transferred while hot to the electric furnace 12 through a pipe 20 connecting the two reactors.

The production of pre-reduced iron containing free surplus coal is unlike the usual conditions for production, which aim to minimise the amount of coal in the pre-reduction furnace. However, as explained above, the free surplus coal enables the functioning of the multiple-hearth furnace 10 to be optimised.

In addition, the use of free coal in the electric furnace 12 also makes it possible to improve the operation of the said electric furnace. In effect, the volatile fractions of the free coal are eliminated in the multiple-hearth furnace and the coal dissolves more easily in the bath of molten pig iron 14.

Sulphides are also eliminated to a large extent in the multiple-hearth furnace 10, which reduces the sulphur concentration in the bath of molten pig iron 14.

An oxygen lance 21 enables a jet of oxygen to be injected for burning the surplus coal. This provides a contribution of energy for the melting of the pre-reduced iron which is added to the electrical energy.

The molten pig iron is discharged from the electric furnace 12 into a crucible 22 through the intermediary of a taphole 23.

It should be noted that the gases from the electric furnace are not introduced into the multiple-hearth furnace 10 but are extracted through an opening 24 in the roof 26 of the electric furnace 12, as indicated by the arrow 28.

The slag-forming agents are introduced beforehand into the multiple-hearth furnace 10 or during the transfer of the pre-reduced iron to the electric furnace 12. With a view to recovering the slag for a later treatment, an opening 24 for the discharge of the slag is provided in the wall of the electric furnace 12.

What is claimed is:

1. Method for producing molten pig iron comprising the following steps:
   (a) reduction of iron ore particles to form pre-reduced iron containing surplus free carbon, said reduction step comprising the following steps:
      (a1) iron ore is introduced into a multiple-hearth furnace with several superimposed hearths and it is deposited on the uppermost hearth of the multiple-hearth furnace,
      (a2) the iron ore is gradually transferred to the lower hearths,
      (a3) a carbon-containing reducing agent is added to one or more of the lower hearths in sufficient amounts to reduce the iron ore and to ensure that there is surplus free carbon,
      (a4) the multiple-hearth furnace is heated and the iron ore is reduced on contact with the carbon-containing reducing agent and the gases produced by the carbon-containing reducing agent at adequate temperatures,
      (a5) the excess gas produced by the carbon-containing reducing agent is burnt in the upper part of the multiple-hearth furnace and advantage is taken of the resultant heat to dry and pre-heat the iron ore,
   (b) transfer while hot of the pre-reduced iron to a melting furnace,
   (c) melting of the pre-reduced iron in a melting furnace in order to obtain the molten pig iron, wherein the gases from the melting furnace are not injected into the multiple-hearth furnace.

2. Method according to claim 1, wherein during step (a) or step (b), slag-forming agents are added.

3. Method according to claim 2, wherein the slag-forming agents are chosen from the group consisting of lime, limestone flux and magnesia as well as mixtures of them.

4. Method according to claim 1, wherein the pre-reduced iron is compacted before its transfer to the melting furnace.

5. Method according to claim 1, wherein the amount of surplus carbon lies between 7 percent and 15 percent.

6. Method according to claim 1, wherein the carbon-containing reducing agent is coal.

7. Method according to claim 1, wherein volatile fractions of the carbon-containing reducing agent are removed during step (a).

8. Method according to claim 1, wherein the carbon-containing reducing agent is desulphurised during step (a).

9. Method according to claim 1, wherein the surplus carbon is consumed during step (c).

10. Method according to claim 1, wherein the melting furnace is an electric furnace.

11. Method according to claim 1, wherein oxygen is injected during step (c) in order to burn part of the surplus free carbon.

* * * * *